(12) United States Patent
De Gersem

(10) Patent No.: US 7,644,563 B2
(45) Date of Patent: Jan. 12, 2010

(54) CLAMPING DEVICE FOR A ROUND BALER

(75) Inventor: Hans Joseph De Gersem, Assebroek (BE)

(73) Assignee: CNH America LLC, New Holland, PA (US)

( * ) Notice: Subject to any disclaimer, the term of this patent is extended or adjusted under 35 U.S.C. 154(b) by 146 days.

(21) Appl. No.: 11/881,377

(22) Filed: Jul. 26, 2007

(65) Prior Publication Data

US 2008/0022649 A1    Jan. 31, 2008

(30) Foreign Application Priority Data

Jul. 27, 2006    (GB) .................................. 0614870.4

(51) Int. Cl.
 *B65B 27/00* (2006.01)
(52) U.S. Cl. .............................. 53/587; 53/118; 56/341
(58) Field of Classification Search ................... 53/211, 53/215, 587, 118; 56/131, 341; 100/87, 100/88
See application file for complete search history.

(56) References Cited

U.S. PATENT DOCUMENTS

| | | | | |
|---|---|---|---|---|
| 4,627,340 | A * | 12/1986 | Glass et al. ..................... | 100/5 |
| 5,129,208 | A * | 7/1992 | Van Zee ........................ | 53/118 |
| 5,243,806 | A * | 9/1993 | Jennings et al. ............... | 53/118 |
| 5,259,167 | A * | 11/1993 | Underhill et al. .............. | 53/118 |
| 5,289,672 | A * | 3/1994 | Underhill ...................... | 53/587 |
| 5,687,548 | A * | 11/1997 | McClure et al. ............... | 53/399 |
| 5,729,953 | A * | 3/1998 | Fell et al. ..................... | 53/118 |
| 5,855,109 | A * | 1/1999 | Vande Ryse et al. .......... | 56/341 |
| 6,021,622 | A * | 2/2000 | Underhill ...................... | 53/118 |
| 6,446,548 | B2 * | 9/2002 | Chow ............................ | 100/4 |
| 2005/0109007 | A1 * | 5/2005 | Hood et al. .................... | 56/341 |

FOREIGN PATENT DOCUMENTS

WO    WO 2005/009112    2/2005

* cited by examiner

*Primary Examiner*—Thomas B Will
*Assistant Examiner*—Mai T Nguyen
(74) *Attorney, Agent, or Firm*—Patrick M. Sheldrake; John William Stader; Michael G. Harms

(57) ABSTRACT

A round baler is disclosed having a bale forming chamber. A duck bill, which comprises a pair of elongate plates that are biased towards one another to grip the wrapping material between them, is movable between an advanced position and a retracted position to introduce the free end of a wrapping material drawn from a supply roll into the bale forming chamber of the baler. A cutting device is located between the retracted position of the duck bill and the bale forming position for severing the length of wrapping material wrapped around the bale in the bale forming chamber at the end of a bale wrapping cycle from the supply roll. In the invention, a clamping device is provided to apply an additional force to urge the plates of the duck bill towards one another while the duck bill is in the retracted position in order for the wrapping material to be gripped more firmly between the plates of the duck bill between bale wrapping cycles.

7 Claims, 5 Drawing Sheets

CLAMPING DEVICE FOR A ROUND BALER

CROSS REFERENCE TO RELATED APPLICATIONS

This Patent Application claims priority under 35 U.S.C. § 119 to GB 0614870.4, filed on Jul. 27, 2006 titled, "Clamping Device for a Round Baler" and having Hans De Gersem as inventor. The full disclosure of GB 0614870.4 is hereby fully incorporated herein by reference.

FIELD OF THE INVENTION

The present invention relates generally to agricultural baling machines and more particularly to a round baler for producing cylindrical bales, commonly referred to as round bales, having improved wrapping apparatus for wrapping a cylindrical package of crop material formed in a bale forming chamber.

BACKGROUND OF THE INVENTION

Round balers generally have a bale forming chamber defined by a pair of opposing side walls associated with an array of side-by-side belts, transverse slats trained on chains, a plurality of transverse rollers or a combination of these various elements, e.g. rollers and belts. During field operation, windrowed crop material such as hay is picked up from the ground and fed in a continuous stream into a fixed or variable diameter chamber. The hay is rolled into a cylindrical package within the chamber, wrapped with twine, netting or a plastics film and ejected onto the ground for subsequent handling.

U.S. Pat. Nos. 5,289,672 and 4,956,968 disclose one type of prior art round baler of the general nature described above. In this particular type of baler an expandable chamber is defined by a pair of fixed sidewalls, and a plurality of side-by-side belts cooperating with a series of transverse rollers, mounted between a pair of pivotally mounted arms. This arrangement of rollers and arms is commonly referred to as a sledge assembly. The chamber includes an inlet opening in the front through which crop material is fed. Also included is a pair of take-up arms pivotally mounted on the main frame, between which arms a pair of guide rollers are journalled. A biasing force on the take-up arms urges the outer surfaces of the guide rollers against the belts to maintain tension and thereby prevent slack from occurring in the belts during expansion and contraction of the chamber. Density of the bale can be affected by varying the force on the take-up arms.

Another type of prior art round baler of the same general nature employs a plurality of transverse rollers to define a cylindrical bale forming chamber with a fixed diameter. Examples of this type of baler are shown in, U.S. Pat. Nos. 4,604,848 and 4,841,851. It should be noted that the latter patent shows additional embodiments wherein a fixed chamber is defined by means other than rollers, i.e. belts (FIG. 7) or chains and slats (FIG. 8).

The present invention relates to a wrapping system for a round baler in which a cylindrical package of crop material is formed in a fixed or expanding chamber which includes one or more transverse rollers or a combination of belts and rollers of the general nature described in U.S. Pat. No. 5,289,672, cited above. This is one example of the many prior art patents that disclose this type of expandable chamber round baler.

It is not uncommon in prior art round balers having this general configuration to feed the wrapping material between a pair of transverse rollers. Alternatively, the chamber could comprise fixed side walls and transverse elements at fixed locations in a configuration of the general nature described in U.S. Pat. No. 4,612,855, cited above.

There is a need for a wrapping system for round balers that consistently introduces wrapping material to the periphery of the cylindrical package formed in the chamber regardless of whether the diameter of the chamber is fixed or variable, and regardless of the nature of the transverse wall, i.e. belts, rollers or chains. More particularly, there is a need for a system that consistently initiates the wrapping function. Such system contributes to improved performance and operability of round balers. Additionally, the features thereof should be consistent with lower manufacturing costs without detracting from simplicity of field operation and serviceability.

EP 0 965 263 discloses a round baler having means for feeding wrapping material from a supply roll of wrapping material into the chamber between two transverse rollers for wrapping around the outer surface of the cylindrical package of crop material to form a round bale of crop material. The two transverse rollers may either be in direct contact with the crop or they may be the drive or guide rollers of a belt or apron which engages the crop. The teaching in EP 0 965 263 is to provide feed assist means extending from the transverse rollers for intermittent contact with the wrapping material as it is being dispensed into the chamber under conditions where the outer surface of a cylindrical package of crop material is being wrapped in the chamber.

An alternative design of the assist means for feeding wrapping material from a supply roll can be seen on a BR7 40 Round Baler from New Holland and is also described in U.S. Pat. No. 6,550,218. The assist means are coupled to a knife linkage which will rotate the knife to a home position when cutting the wrapping material.

The present invention is concerned with the means for introducing the wrapping material from a supply roll into the chamber. These means are constituted in EP 0 965 263 and U.S. Pat. No. 6,550,218 by a device also known, and referred to herein, as a duck bill. A duck bill is formed by two plates of which one is spring biased towards the other. One plate is fixed between two end plates, also called the duckbill cams, and the other is hinged and spring biased towards the fixed plate, the wrapping material being gripped between the free edge of the spring biased plate and the fixed plate. Such a design acts as a one-way clutch which allows the wrapping material to move in only one direction through the duck bill.

The end plates are arranged to move both plates of the duck bill between a retracted position and an advanced position. When the duck bill is moved into its advanced position, its two plates pass between two transverse rollers and pull the leading edge of the wrapping material into the bale forming chamber. Once the wrapping material is engaged by the rotating crop or one of the two transverse rollers, normally the lower roller, it is carried around the bale that is being formed and the required wrapping material is drawn freely from the supply roll through the duck bill. While the bale is being wrapped or after wrapping has ended, the duck bill is withdrawn to its retracted position. Towards the end of the baling cycle, a cutter is used to sever the wrapping material at a point between the duck bill and the wrapped bale. The material to one side of the cutter is drawn into the bale forming chamber by the rotating bale while the free end of the wrapping material from the supply remains gripped between the two plates of the duck bill in readiness to wrap the bale that is formed in the next baling cycle.

A problem is encountered with this form of duck bill, which is especially pronounced when the wrapping material is a plastics sheet coated on one side with an adhesive.

Between wrapping cycles, the supply roll is locked to prevent further wrapping material from being drawn from it. However, despite the feed clutch action of the duck bill, it is found that the short length of wrapping material that remains protruding from the duck bill immediately after operation of the cutting device, tends to creep back between the plates of the duck bill towards the supply roll. This creeping of the wrapping material may be the result of a variety of causes, amongst them wind, vibration, and the action of a spreader roller incorporated in the duck bill which prevents the wrapping material from bunching in the middle and spreads it over the full width of the buck bill and the bale.

If the wrapping material creeps back to such an extent that its free end is drawn back through the duck bill, then this will prevent the wrapping material from being taken up by the newly formed bale in the following wrapping cycle. Even if not fully drawn back through the duck bill, the slack in the wrapping material between the duck bill and the supply roll can result in the material being wrapped around the spreader roller. Because the wrapping material is designed to adhere to itself, clearing the resulting feed jam and rethreading the wrapping material through the duck bill is a difficult and time consuming task.

SUMMARY OF THE INVENTION

With a view to mitigating the foregoing disadvantage, there is provided in accordance with the present invention, a round baler having a bale forming chamber, a duck bill which comprises a pair of elongate plates that are biased towards one another to grip the wrapping material therebetween and which is movable between an advanced position and a retracted position to introduce the free end of a wrapping material drawn from a supply roll into the bale forming chamber of the baler, and a cutting device located between the retracted position of the duck bill and the bale forming position for severing the length of wrapping material wrapped around the bale in the bale forming chamber at the end of a bale wrapping cycle from the supply roll, characterised in that a clamping device is provided to apply an additional force to urge the plates of the duck bill towards one another while the duck bill is in the retracted position in order for the wrapping material to be gripped more firmly by the duck bill between bale wrapping cycles.

It is preferable for the clamping mechanism and the cutting device to be operated by a common command such that the gripping force of the duck bill is increased by the clamping device when the cutting device is in the severing position.

It is known for one of the plates of the duck bill to be mounted on two pivotably mounted end plates or duckbill cams, and for the cutting device also to be pivotably mounted, and connected by two linking arms to the end plates of the duck bill such that the cutting device is raised by the linking arms into the severing position as the duck bill is returned to the retracted position at the end of a bale wrapping cycle. I a round baler of such a design, the clamping device may simply comprise a clamping bar supported at its ends on the linking arms.

As there may be obstructions between the two linking arms to interfere with the movement of the clamping bar, the clamping bar may be mounted on support sleeves that are slidably fitted over the linking arms and stops may be provided on the linking arms to act on the support sleeves of the clamping bar when the duck bill is in its retracted position between wrapping cycles.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

The drawings and following description concentrate on a wrapping mechanism for use in a baler. The remainder of baler will not be described or illustrated in detail but it is mentioned for completeness that the baler may be as described in U.S. Pat. No. 4,956,968, which is imported herein by reference.

Figure 1:
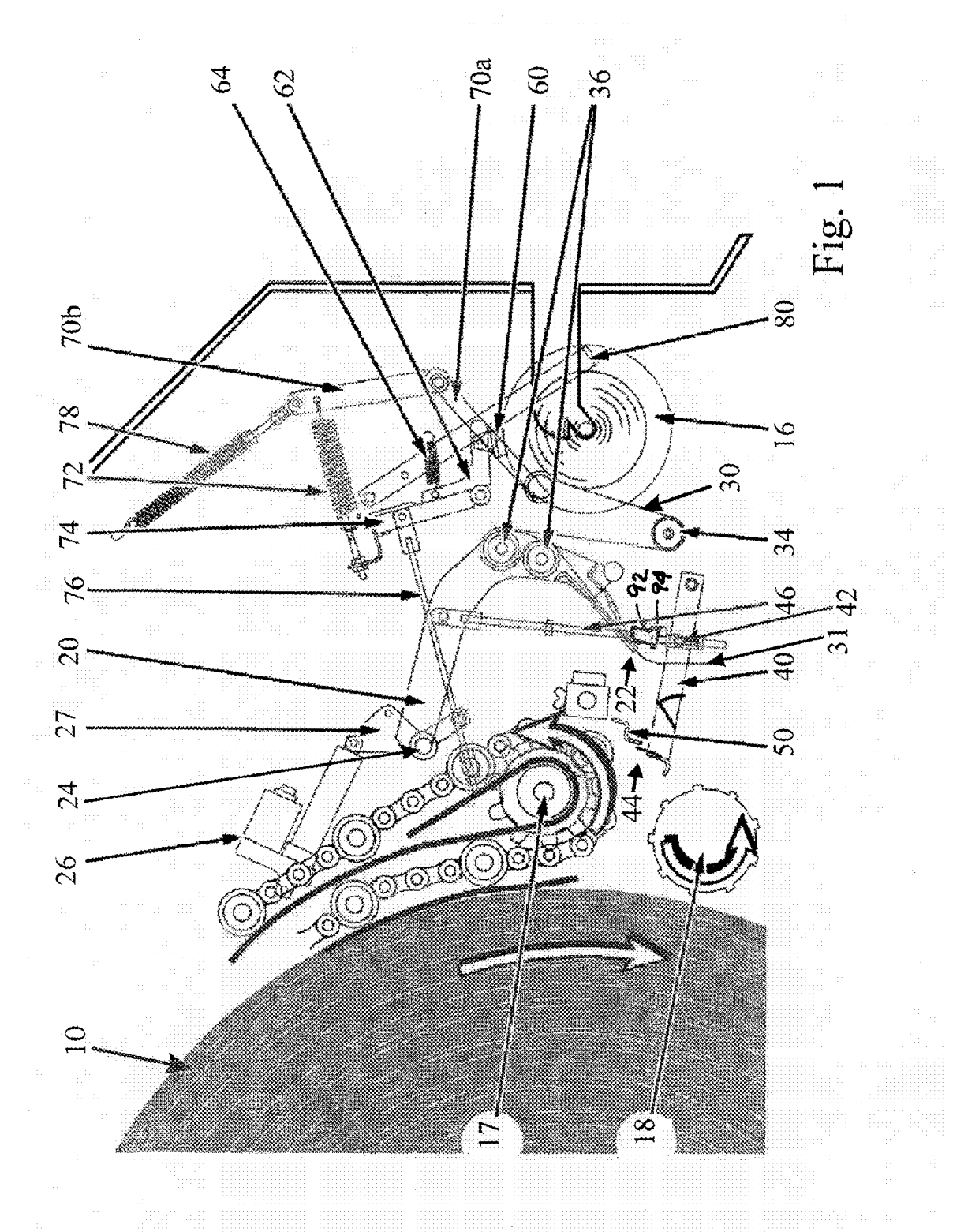
FIGS. 1 to 3 are schematic representations of the bale wrapping mechanism of a round baler of the invention at different stages during a bale wrapping cycle.

In accompanying FIG. 1, a bale being formed in the bale forming chamber of a round baler is designated 10. The bale 10 is caused to rotate within the chamber by various transverse rollers and/or belts connected to a chain driven drive roller 17. To wrap the bale 10 (see FIG. 2) wrapping material 30 drawn from a supply roll 16 is introduced through the gap between the drive roller 17 and a stripper roller 18 into the bale forming chamber.

The feed mechanism comprises two end plates 20 arranged on opposite sides of the baler and a duck bill generally designated 22 which extends across the width of the baler between the two end plates 20. In the duck bill 22, the wrapping material is gripped between an upper plate that is fixed to the two end plates 20 and a pivoted lower plate that is spring biased towards the fixed plate. The wrapping material 30 passes between the fixed plate and the pivoted plate and is gripped by them. Because the duck bill acts as a one-way clutch, the wrapping material can pass freely through the duck bill 22 when moving towards the bale forming chamber but meets with resistance in the opposite direction.

Figure 2:
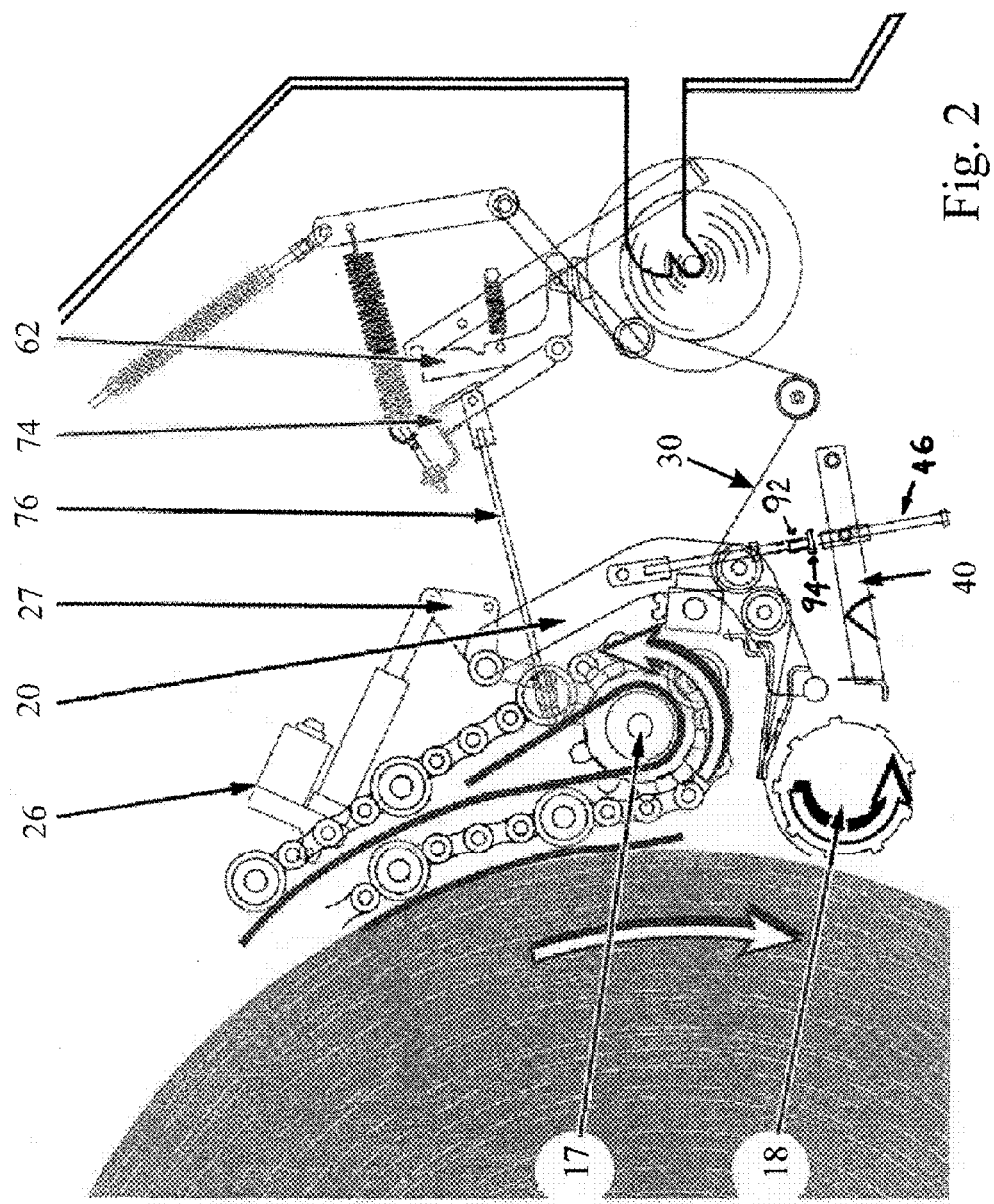

The two end plates 20 are pivoted about an axis 24 and are connected by a linkage 27 to a hydraulic actuator 26 which acts to pivot the duck bill 22 between the two end positions show in FIGS. 1 and 2. The wrapping material 30 is guided over a metering roller 34 and two guide rollers 36 that are mounted for movement with the duck bill 22 and the end plates 20. As is known, each of the guide rollers 36 may be formed near its two axial ends with oppositely handed helical formations which act as spreaders to keep the wrapping material taut across the width of the duck bill 22.

FIGS. 1 and 2 also show a cutting mechanism for severing the wrapping material 30 after a bale has been formed. The cutting mechanism comprises a knife 44 carried by two arms 40 pivoted about an axis 42 and operated by means of two linking rods 46 which connect the arms 40 to the end plates 20 of the duck bill 22. In this way, as the duck bill is retracted by the actuator 26 to the position shown in FIG. 1, this being the position adopted by the duck bill 22 in between operating cycles of the wrapping mechanism, the knife 44 is raised against a fixed striker plate or shear bar 50 to separate the length of material wrapped around the newly formed bale 10 from the supply roll 16.

Figure 3:
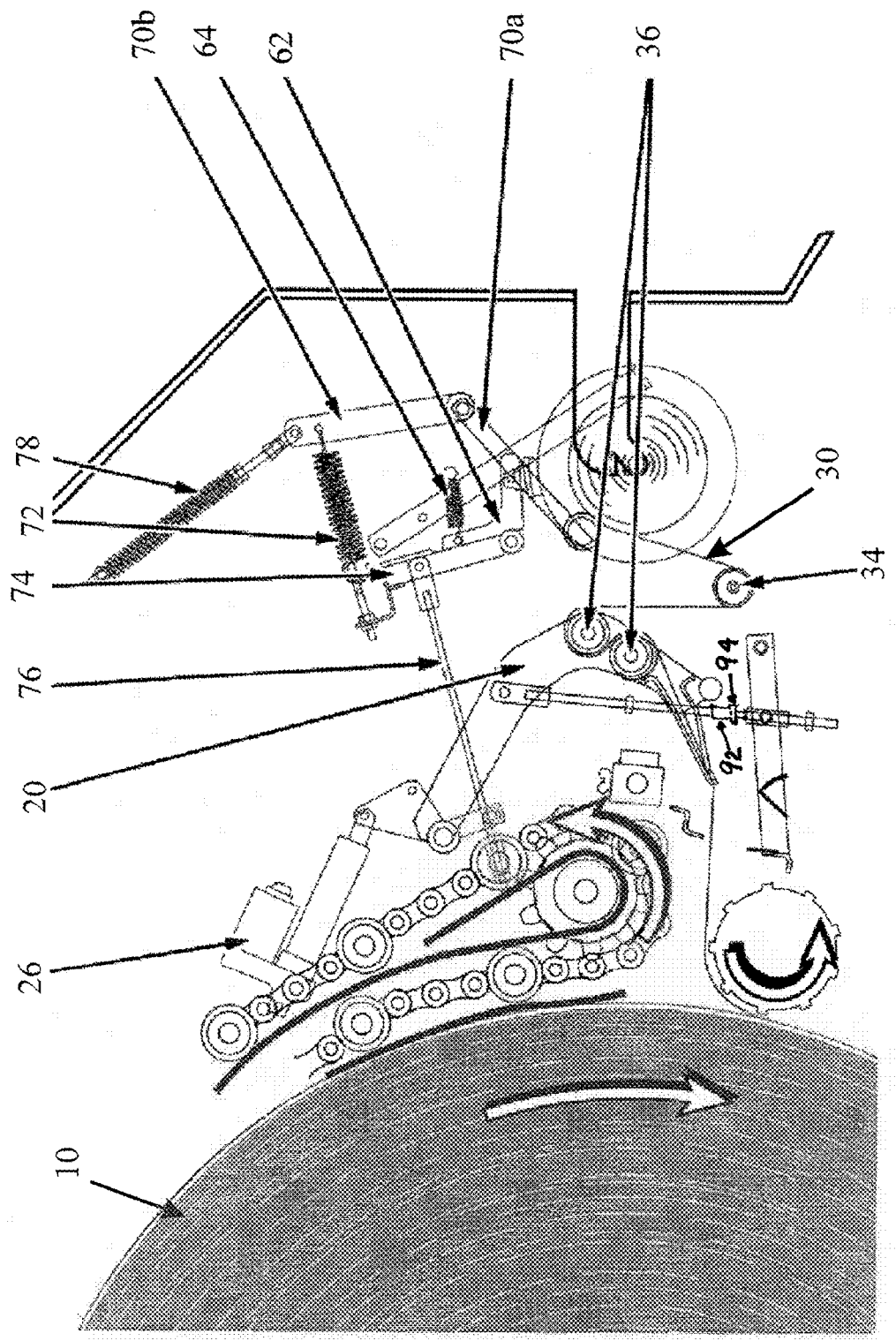

FIGS. 1 to 3 further show that primary and secondary brake mechanisms are associated with the supply roll 16. The primary brake mechanism comprises a brake pad 60, a lever 62 and a spring 64 and applies a braking force while material is being drawn from the supply roll 16 in order to maintain the material under tension. The secondary brake mechanism, which varies the braking as the size of the supply roll changes comprises a roll size gauge levers 70a and 70b, springs 72 and 78 and a lever 74. A braking force is applied to prevent any movement of the supply roll between wrapping cycles and a brake release lever 76 disengages this braking force whenever the duck bill 22 is not in the position shown in FIG. 1. The item designated 80 in the drawings is a control handle that is used during replacement of the supply roll. The brake mechanisms and the control handle have been described briefly for completeness but their method of operation is not of importance to the present invention and will not therefore be described in greater detail. It suffices for the purposes of the present invention to understand that the supply roll 16 is braked between bale wrapping cycle but allows wrapping material to be drawn from the roll 16 while it is maintained under tension during the wrapping cycle.

At the end of a wrapping cycle and at the commencement of the next, the duck bill 22 is in the position shown in FIG. 1 in which the knife 44 has been operated to sever the wrapping material a short distance in front of the duck bill 22 to leave a loose flat of wrapping material 30 protruding from the duck bill 22.

To commence a new wrapping cycle after the next bale has been formed, the hydraulic actuator 26 is operated to rotate the end plates 20 into the position shown in FIG. 2. This advances the duck bill 22 into the gap between the rollers 17 and 18. The protruding flap 31 of wrapping material 30 is stripped off the duck bill by the stripper roller 18 and introduced into the bale forming chamber. The flap 31 is then gripped by the bale 10 and carried round the periphery of the bale forming chamber. At some stage after it has been sensed that the wrapping material is being drawn from the supply roll 16, the duck bill is returned by the end plates 20 to the position shown in FIG. 3. Once the metering roller 34 has sensed that the sufficient material has been dispensed to wrap the bale fully, the duck bill 22 is returned to the position shown in FIG. 1 and during this last movement the linking rods 46 raise the arms 40 of the cutting device so that the material is severed between the knife 44 and the shear bar 50, leaving a flap of material 31 protruding from the duck bill 22 in readiness for the following cycle.

The above brief description is believed to suffice for an understanding of the present invention but it should be added that, as so far described, the baler and the wrapping mechanism operate in a manner generally analogous to that well documented in the prior art referred to above and further reference may be made to earlier publications for a more detailed description.

As has earlier been mentioned, the duck bill 22 acts as a one-way clutch device and its design is intended to prevent the wrapping material from being drawn back through it towards the supply roll 16. In practice, however, it is found that the wrapping material does creep back through the duck bill on account of such factors as vibration, wind and tension in the wrapping material caused by the metering roller 34. This can result in the leading edge of the wrapping material being pulled back through the duck bill, thereby preventing the stripper roller 18 from fulfilling its function in the next cycle. Furthermore, if sufficient slack is created in the material passing around the spreader rollers 36, there develops a tendency for the material to wrap itself around these rollers causing a feed jam that is difficult and time consuming to rectify, especially because the wrapping material has an adhesive on one side (the side facing the inside of the bale and the outside of the supply roll 16) which makes the material stick to itself.

To avoid these problems, the illustrated embodiment of the invention (see FIG. 4) incorporates a clamping bar 90 secured at its opposite ends to two support sleeves 92 that are slidable over the linking rods 46. Nuts 94 on the linking rods 46 act as adjustable stops which are positioned such that the clamping bar 90 abuts the lower pivotable plate of the duck bill 22 and increases the clamping force acting to grip between the plates of the duck bill 22. Correct positioning of the nuts 94 enables regulation of the upward force (represented by two arrows in FIG. 4) applied by the clamping bar to the pivotable lower plate of the duck bill 22 when the cutter is raised to the position shown in FIG. 1. It would, however, be alternatively possible to provide springs (not shown) between the nuts 94 and the sleeves 62 to regulate the clamping force, thereby reducing the necessary tolerance in the adjustment of the nuts 94.

The support sleeves 92 allow the clamping bar to slide up the linking rods if they should impact an obstruction when the cutting device is lower but one the return movement of the linking rods 46, the nuts 94 will again come into contact with the sleeves 92 and raise the clamping bar 90 towards the pivotable plate of the duck bill 22.

Figure 4:
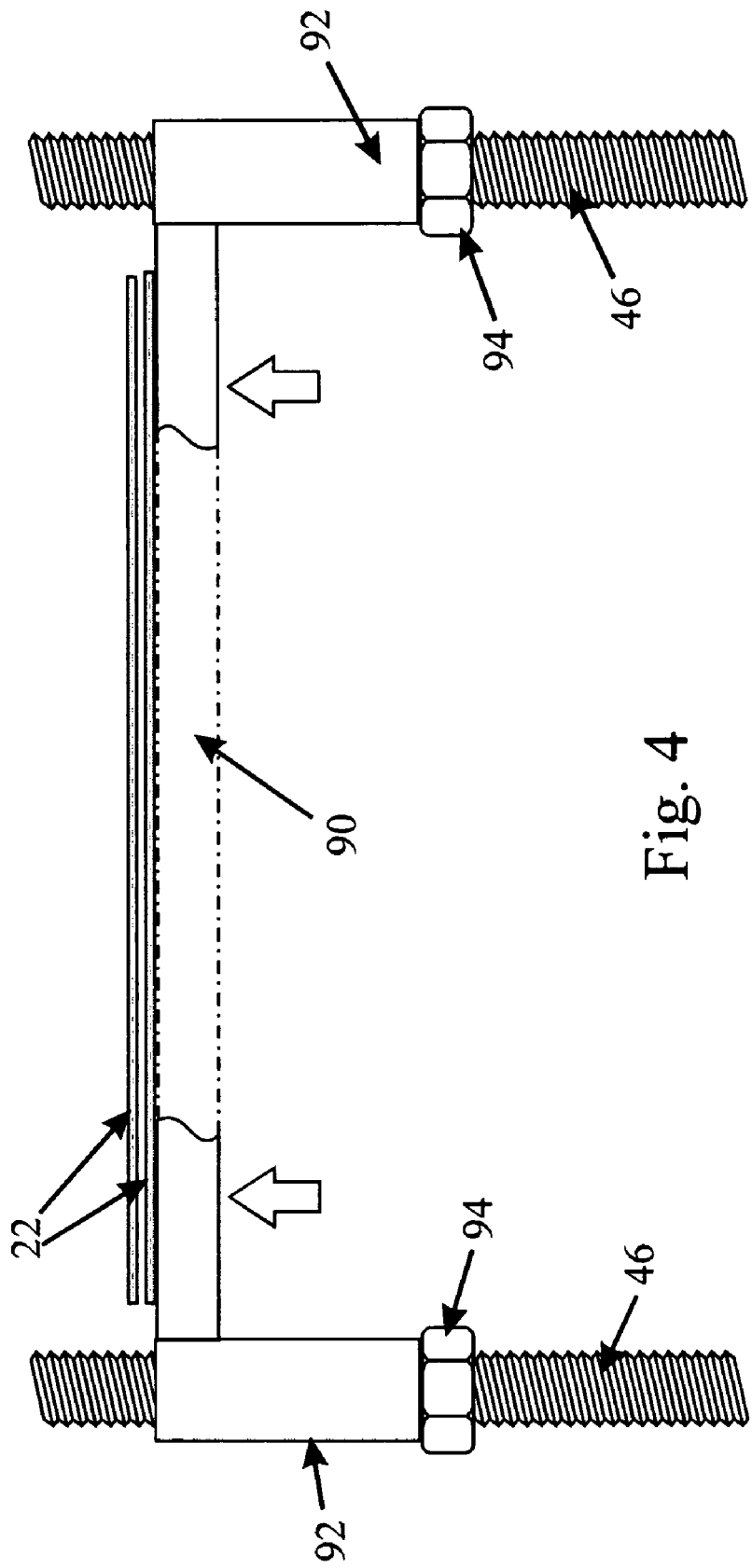
FIG. 4 is a detail showing the clamping bar and a section through the plates of the duck bill when in between bale wrapping cycles.
Figure 5:
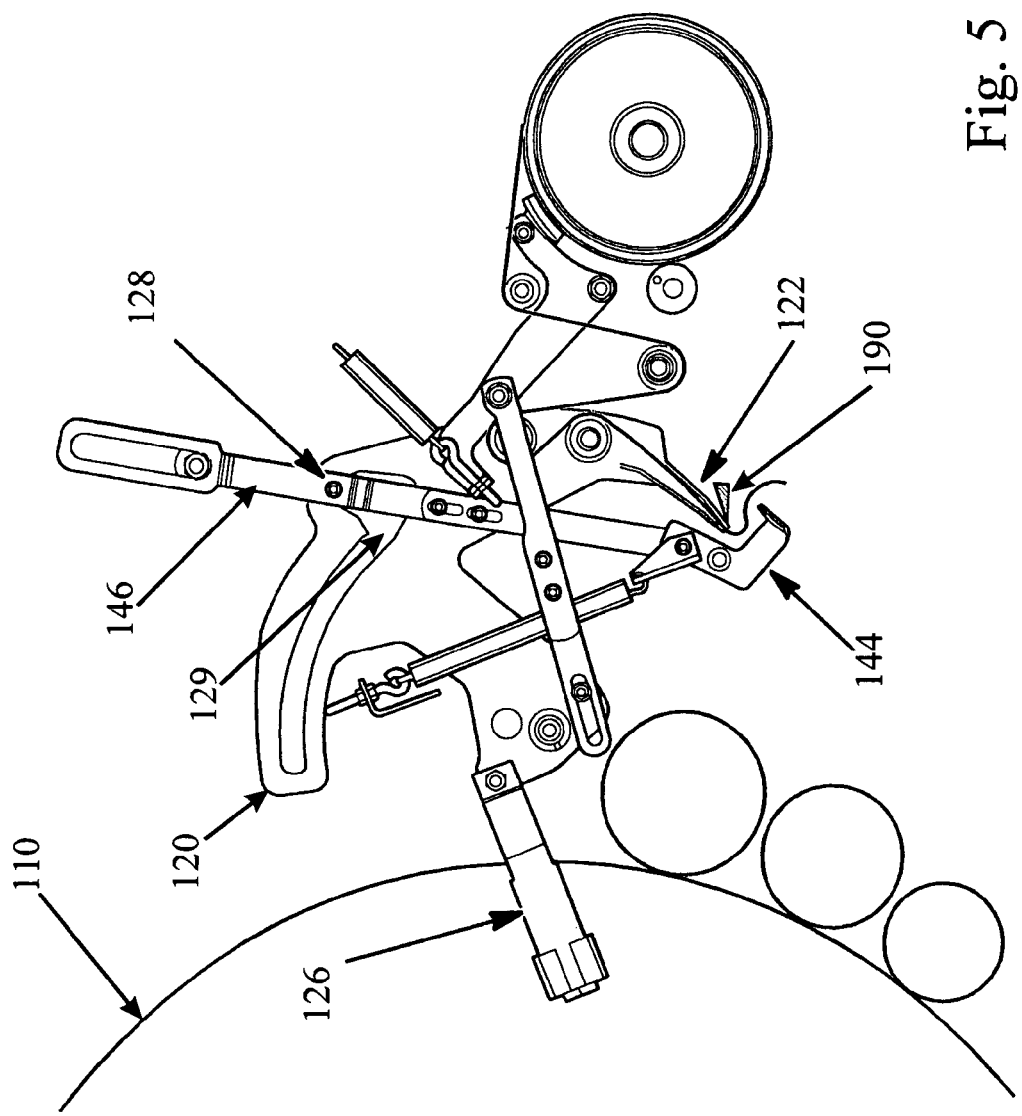
FIG. 5 is a schematic representation of the alternative design of the bale wrapping mechanism of a round baler of the invention.

FIG. 5 shows an alternative design of the feed mechanism having a comparable working as the feed mechanism of FIGS. 1 to 3. The main difference is the position and working of the knife 144 in relation to the movement of the duck bill 122. When enough wrapping material has been wrapped on the bale 110, an actuator 126 will be retracted to the home position. A bushing 128, attached to the knife linkage 127 and riding in a slot 129 of the duck bill cam 120, will encounter a flat spot in the slot 129. The cam 120 will push the knife linkage 127 up and rotate the knife 144 under spring tension to the home position, thus cutting the net. A clamping bar 190, similar to the clamping bar 90 of FIG. 4 is attached to the chassis of the baler, such that when the duck bill 122 is retracted, the lower plate of the duck bill 122 will slide against the clamping bar 190 in such a manner that increasing clamping force is applied to the upper and lower plate of the duck bill 122.

The clamping bar 190 may be constructed as a wedge, so that the increasing clamping force is applied gradually to prevent damage to the plates of the duckbill 122.

The invention claimed is:

1. A round baler comprising:
   a bale forming chamber;
   a duck bill assembly which comprises a pair of elongate plates that are biased towards one another to grip wrapping material therebetween and which is movable between an advanced position and a retracted position to introduce a free end of the wrapping material drawn from a supply roll into the bale forming chamber of the baler; and
   a cutting device located between the retracted position of the duck bill assembly and the bale forming position for severing a length of wrapping material wrapped around a bale in the bale forming chamber at the end of a bale wrapping cycle from the supply roll,
   wherein a clamping device is configured to apply an additional force to at least one plate of the duck bill assembly, while the duck bill assembly is in the retracted position, such that the additional force on the plate increases the grip on the wrapping material by the duck bill assembly between bale wrapping cycles.

2. A round baler of claim 1, wherein the clamping device and the cutting device are operated by a common actuator such that the gripping force of the plates of the duck bill assembly is increased by the clamping device when a cutting device is in the severing position.

3. A round baler of claim 2, wherein at least one of the plates of the duck bill assembly is mounted on two pivotably mounted end plates, the cutting device is also pivotably mounted, two linking arms are provided between the end plates of the duck bill assembly and the cutting device such that the cutting device is raised by the linking arms into the severing position as the duck bill assembly is returned to the retracted position at the end of a bale wrapping cycle, and the clamping device comprises a clamping bar supported at its ends on the linking arms.

4. A round baler of claim 1, wherein the clamping device is mounted to the chassis of the round baler, so that when the duck bill assembly moves to the retracted position a force is applied to at least one elongate plate of the duck bill assembly by contact with the clamping device.

5. A round baler of claim 4, wherein the clamping device is a wedge configured to increased the force applied to the plate as the duckbill assembly is moved to the retracted position.

6. A round baler comprising:

a bale forming chamber;

a duck bill assembly which comprises a pair of elongate plates that are biased towards one another to grip wrapping material therebetween and which is movable between an advanced position and a retracted position to introduce a free end of the wrapping material drawn from a supply roll into the bale forming chamber of the baler; and a cutting device located between the retracted position of the duck bill assembly and the bale forming position for severing a length of wrapping material wrapped around a bale in the bale forming chamber at the end of a bale wrapping cycle from the supply roll, wherein a clamping device is provided to apply an additional force to the duck bill assembly while the duck bill assembly is in the retracted position in order for the wrapping material to be grinned more firmly by the duck bill assembly between bale wrapping cycles;

at least one of the plates of the duck bill assembly is mounted on two pivotably mounted end plates, the cutting device is also pivotably mounted, two linking arms are provided between the end plates of the duck bill assembly and the cutting device such that the cutting device is raised by the linking arms into the severing position as the duck bill assembly is returned to the retracted position at the end of a bale wrapping cycle;

the clamping device comprises a clamping bar supported at its ends on the linking arms; and wherein the clamping bar is mounted on support sleeves that are slidably fitted over the linking arms and stops are provided on the linking arms to act on the support sleeves of the clamping bar when the duck bill assembly is in the retracted position between wrapping cycles.

7. A round baler of claim 6, wherein linking arms act on the support sleeves of the clamping bar by way of springs.

* * * * *